United States Patent
Kim et al.

(10) Patent No.: US 8,322,250 B2
(45) Date of Patent: Dec. 4, 2012

(54) HUMANOID ROBOT AND SHOULDER JOINT ASSEMBLY THEREOF

(75) Inventors: Jeong Hun Kim, Suwon-si (KR); Young Bo Shim, Seoul (KR); Yeon Taek Oh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 556 days.

(21) Appl. No.: 12/382,003

(22) Filed: Mar. 5, 2009

(65) Prior Publication Data

US 2009/0282944 A1 Nov. 19, 2009

(30) Foreign Application Priority Data

May 14, 2008 (KR) .................. 10-2008-0044391

(51) Int. Cl.
*B25J 17/00* (2006.01)
*B25J 17/02* (2006.01)
*B25J 18/00* (2006.01)

(52) U.S. Cl. ....................... 74/490.05; 901/28
(58) Field of Classification Search .............. 74/490.05, 74/490.01; 901/28
See application file for complete search history.

(56) References Cited

U.S. PATENT DOCUMENTS

| | | | | |
|---|---|---|---|---|
| 3,557,387 A * | 1/1971 | Ohlenbusch et al. | ............. | 23/24 |
| 3,915,305 A * | 10/1975 | Guida | ............... | 211/1 |
| 4,046,262 A * | 9/1977 | Vykukal et al. | .................. | 414/5 |
| 4,095,481 A * | 6/1978 | Kasai et al. | ..................... | 74/469 |
| 4,206,564 A * | 6/1980 | Ogawa | ............. | 446/94 |
| 4,300,362 A * | 11/1981 | Lande et al. | ................... | 464/117 |
| 4,571,209 A * | 2/1986 | Manning et al. | ............. | 446/375 |
| 4,889,210 A * | 12/1989 | Alcaraz et al. | ................. | 186/38 |
| 5,100,138 A * | 3/1992 | Wilde | ........................ | 273/440.1 |
| 5,410,944 A * | 5/1995 | Cushman | ........................ | 91/520 |
| 5,656,905 A * | 8/1997 | Tsai | ......................... | 318/568.21 |
| 5,676,157 A * | 10/1997 | Kramer | ........................ | 600/595 |
| 6,022,263 A * | 2/2000 | Liu et al. | ........................ | 446/379 |
| 6,186,458 B1 * | 2/2001 | Hansen | ....................... | 248/274.1 |
| 6,236,906 B1 * | 5/2001 | Muller | .......................... | 700/258 |
| 6,263,755 B1 * | 7/2001 | Perlin | ......................... | 74/490.01 |
| 6,332,372 B1 * | 12/2001 | Takenaka et al. | ........... | 74/490.05 |
| 6,516,681 B1 * | 2/2003 | Pierrot et al. | ............... | 74/490.01 |
| 6,580,970 B2 * | 6/2003 | Matsuda et al. | ............... | 700/245 |
| 6,786,896 B1 * | 9/2004 | Madhani et al. | ................... | 606/1 |
| 7,313,463 B2 * | 12/2007 | Herr et al. | ..................... | 700/245 |
| 8,003,916 B2 * | 8/2011 | Ohara et al. | ............. | 219/137.31 |
| 2001/0030523 A1 * | 10/2001 | Mori et al. | ............... | 318/568.12 |
| 2002/0061504 A1 * | 5/2002 | Saijo et al. | ..................... | 434/268 |
| 2002/0062178 A1 * | 5/2002 | Takahashi et al. | ............. | 700/245 |
| 2003/0223844 A1 * | 12/2003 | Schiele et al. | ..................... | 414/5 |
| 2004/0025619 A1 * | 2/2004 | Nakamura et al. | ......... | 74/490.05 |

(Continued)

FOREIGN PATENT DOCUMENTS

KR 10-0749878 8/2007

*Primary Examiner* — Justin Krause
(74) *Attorney, Agent, or Firm* — Staas & Halsey LLP (57) ABSTRACT

A humanoid robot to naturally imitate various motions and gestures of humans and a shoulder joint assembly thereof is disclosed. The humanoid robot includes a first shoulder joint device disposed between a body and an arm of the robot, to move the arm. The entire first shoulder joint device is movable relative to the body. For this, a second shoulder joint device may be installed between the body and the first shoulder joint device to move the first shoulder joint device.

21 Claims, 7 Drawing Sheets

U.S. PATENT DOCUMENTS

| | | | |
|---|---|---|---|
| 2004/0164697 A1* | 8/2004 | Iribe | 318/568.12 |
| 2004/0205417 A1* | 10/2004 | Moridaira et al. | 714/48 |
| 2004/0211603 A1* | 10/2004 | Furuta et al. | 180/8.1 |
| 2007/0146371 A1* | 6/2007 | Dariush | 345/474 |
| 2008/0235970 A1* | 10/2008 | Crampton | 33/503 |
| 2009/0248202 A1* | 10/2009 | Osuka et al. | 700/245 |
| 2010/0299101 A1* | 11/2010 | Shimada et al. | 702/150 |
| 2011/0185837 A1* | 8/2011 | Alfayad et al. | 74/490.05 |
| 2011/0297461 A1* | 12/2011 | Miyazaki | 180/8.6 |

* cited by examiner

HUMANOID ROBOT AND SHOULDER JOINT ASSEMBLY THEREOF

CROSS-REFERENCE TO RELATED APPLICATIONS

This application claims the benefit of Korean Patent Application No. 2008-0044391, filed on May 14, 2008 in the Korean Intellectual Property Office, the disclosure of which is incorporated herein by reference.

BACKGROUND

1. Field

The present invention relates to a humanoid robot, and, more particularly, to a humanoid robot in which a shoulder joint has an improved operational Degree Of Freedom (DOF), enabling implementation of a variety of motions.

2. Description of the Related Art

Robots are mechanical devices to automatically perform certain operations or tasks, and are utilized to substitute or assist humans in various fields.

Of a variety of robots, industrial robots have a high degree of utilization. The industrial robots enable automation and unmanning of production lines, achieving an improvement in productivity. Further, industrial robots are used to implement dangerous operations in place of humans, thereby protecting humans from industrial accidents.

Recently, humanoid robots, which have an external appearance and actions similar to humans, have been developed. In the same manner as industrial robots, the humanoid robots can be committed to various industrial locations, to execute operations which humans have difficulty with. However, the primary advantage of the humanoid robots is that they provide a variety of services while coexisting with humans in daily life, rather than for the purpose of replacing humans.

To assure smooth association and cooperation in daily life between a robot and a human, it is preferred that the robot be capable of imitating various motions and gestures of humans. Since a substantial number of motions and gestures performed by humans are performed using the arms, it can be said that realizing a robot arm motion similar to that of humans is important in order to improve emotional connection between humans and robots.

Korean Patent Registration No. 0749878 discloses a humanoid robot arm wherein a shoulder joint, an elbow joint and a wrist joint have an operational DOF of 3, 1 and 3, respectively, so as to imitate arm motions of humans to some extent.

However, in the disclosed conventional robot arm, the shoulder joint has only a rotational DOF of 3, having a limit to naturally implement various motions and gestures of humans.

Another problem of the conventional robot arm having the above-described configuration is that the robot arm is moved in a state wherein the shoulder joint is fixed to the robot body and therefore cannot achieve a wide range of movement without movement of a robot body.

SUMMARY

Accordingly, it is an aspect of the present invention to provide a humanoid robot and a shoulder joint assembly thereof, which can naturally imitate various motions and gestures of humans.

It is another aspect of the present invention to provide a humanoid robot and a shoulder joint assembly thereof, which is improved to widen a range of movement of a robot arm.

Additional aspects and/or advantages of the invention will be set forth in part in the description which follows and, in part, will be apparent from the description, or may be learned by practice of the invention.

The foregoing and/or other aspects of the present invention are achieved by providing a humanoid robot including: a body; an arm; a first shoulder joint device disposed between the body and the arm, to move the arm, wherein the entire first shoulder joint device is movable relative to the body.

The humanoid robot may further include: a second shoulder joint device disposed between the body and the first shoulder joint device, to move the first shoulder joint device. The first shoulder joint device may have a Degree Of Freedom (DOF) of 3. The second shoulder joint device may have a rotational DOF of at least 1. The second shoulder joint device may have a translational DOF of at least 1. The second shoulder joint device may have a DOF of 3. The second shoulder joint device may have a rotational DOF of 2 and a translational DOF of 1.

The second shoulder joint device may include a roll-directional rotating joint. The second shoulder joint device may include a yaw-directional rotating joint. The second shoulder joint device may be installed to the body in a vertically movable manner.

The foregoing and/or other aspects of the present invention are achieved by providing a humanoid robot including: an arm; a body; a first shoulder joint device connected to the arm and having a DOF of 3; and a second shoulder joint device to connect the body and the first shoulder joint device to each other and to move the first shoulder joint device.

The foregoing and/or other aspects of the present invention are achieved by providing a humanoid robot including: an arm; a body; a first shoulder joint device connected to the arm; a second shoulder joint device connected to the first shoulder joint device and including a translating joint to translate the first shoulder joint device.

The translating joint may move the first shoulder joint device vertically. The second shoulder joint device may further include at least one rotating joint. The second shoulder joint device may include a first rotating joint to rotate the first shoulder joint device in a roll direction.

The second shoulder joint device may include a second rotating joint to rotate the first shoulder joint device and the first rotating joint in a yaw direction.

The translating joint may translate the first rotating joint and the second rotating joint.

In accordance with a still another aspect of the present invention, there is provided a shoulder joint assembly of a humanoid robot having a DOF of at least 4.

The foregoing and/or other aspects of the present invention are achieved by providing a shoulder joint assembly of a humanoid robot including: an arm; a body; a first shoulder joint device connected to the arm; and a second shoulder joint device connected to the body and the first shoulder joint device, wherein the second shoulder joint device includes a first rotating joint and a second rotating joint to rotate the first shoulder joint device in a roll direction and a yaw direction, respectively, and a translating joint to translate the first shoulder joint device.

BRIEF DESCRIPTION OF THE DRAWINGS

These and/or other aspects and advantages of the exemplary embodiments will become apparent and more readily appreciated from the following description of the embodiments, taken in conjunction with the accompanying drawings, of which.

DETAILED DESCRIPTION OF THE EMBODIMENT

Reference will now be made in detail to an embodiment, an example of which is illustrated in the accompanying drawings, wherein like reference numerals refer to like elements throughout. The embodiment is described below to explain the present invention by referring to the figures.

Figure 1:
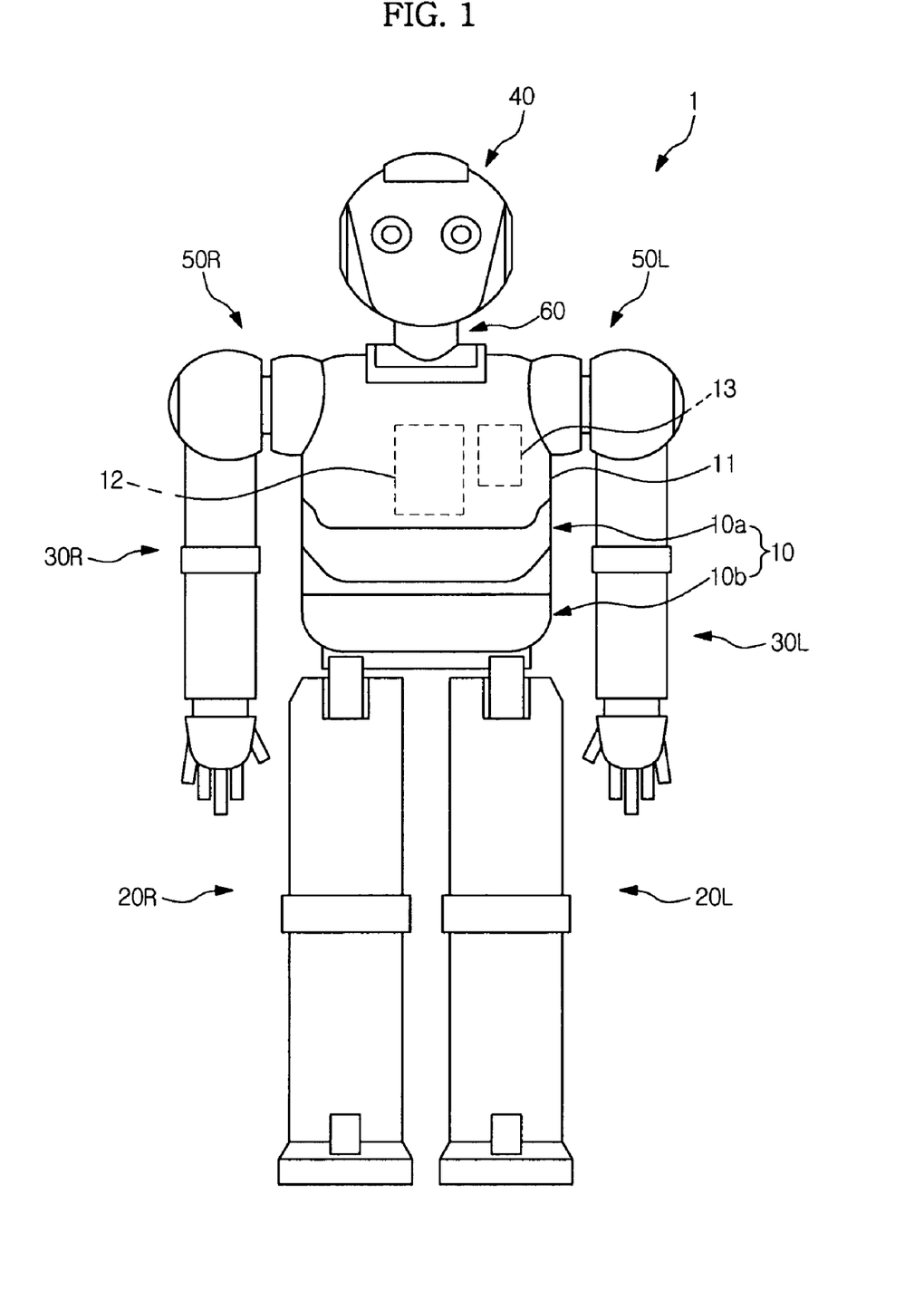
FIG. 1 is a view illustrating an outer appearance of a humanoid robot in accordance with an embodiment of the present invention.
Figure 2:
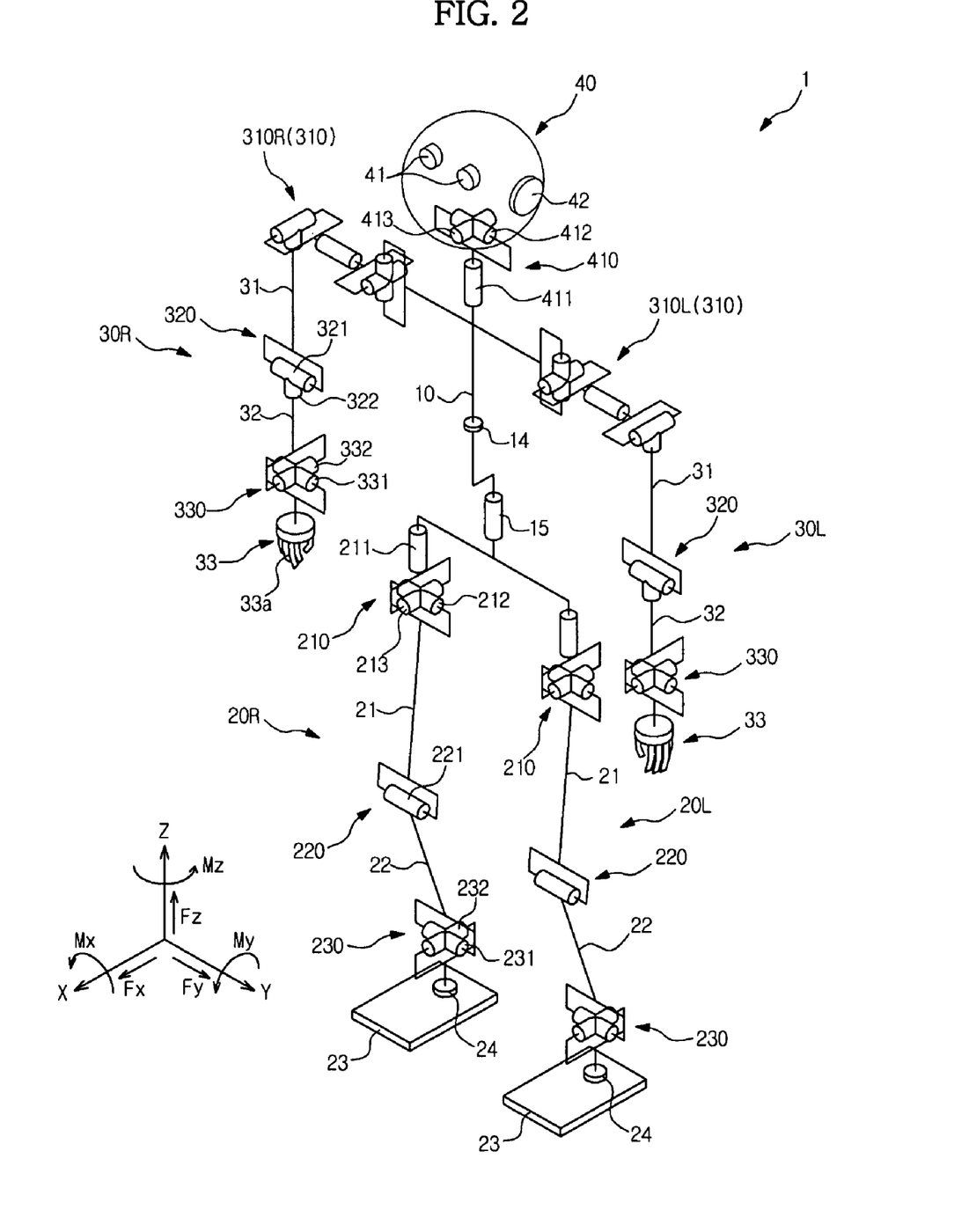
FIG. 2 is a view schematically illustrating a configuration of the humanoid robot of FIG. 1.

Hereinafter, a preferred embodiment in accordance with the embodiment of the present invention will be described in detail with reference to the accompanying drawings. FIG. 1 is a view illustrating an outer appearance of a humanoid robot in accordance with an embodiment of the present invention. FIG. 2 is a view schematically illustrating a configuration of the humanoid robot of FIG. 1.

As shown in FIGS. 1 and 2, the humanoid robot 1 (hereinafter, simply referred to as a 'robot') includes a body 10, legs 20R and 20L connected to lower opposite sides of the body 10, arms 30R and 30L connected to upper opposite sides of the body 10, and a head 40 connected to an upper end of the body 10. Both the arms 30R and 30L are connected to the body 10 via shoulders 50R and 50L, and the head 40 is connected to the body 10 via a neck 60. Here, reference letters "R" and "L" represent the right side and the left side, respectively.

The interior of the body 10 is protected by a cover 11. A control unit 12, a battery 13, and a tilt sensor 14 (See FIG. 2) may be installed within the body 10. The tilt sensor 14 is used to detect a tilt angle of the body 10 with respect to a vertical axis, an angular velocity of the body 10, etc.

The body 10 may be divided into a chest part 10a and a waist part 10b. A joint 15 may be installed between the chest part 10a and the waist part 10b, to allow the chest part 10a to rotate relative to the waist part 10b. In FIG. 2, the body 10 is illustrated simply as a body link.

Each of the legs 20R and 20L includes a thigh link 21, a crus link 22 and a foot 23. The thigh link 21 is connected to the body 10 via a thigh joint mechanism 210. The thigh link 21 and the crus link 22 are connected to each other via a knee joint mechanism 220, and the crus link 22 and the foot 23 are connected to each other via an ankle joint mechanism 230.

The thigh joint mechanism 210 has a DOF of 3. More specifically, the thigh joint mechanism 210 may include a yaw-directional rotating joint 211 to rotate about a Z-axis, a pitch-directional rotating joint 212 to rotate about a Y-axis, and a roll-directional rotating joint 213 to rotate about an X-axis.

The knee joint mechanism 220 includes a pitch-directional rotating joint 221 and thus, has a DOF of 1. The ankle joint mechanism 230 includes a pitch-directional rotating joint 231 and a roll-directional rotating joint 232 and thus, has a DOF of 2.

In conclusion, each leg 20R or 20L is provided with six rotating joints for three joint mechanisms as described above, and both the legs 20R and 20L are provided with twelve rotating joints. Although not shown in the drawings, each of the legs 20R and 20L is installed with motors to drive the respective rotating joints. The control unit 12 appropriately controls the motors provided at the legs 20R and 20L, to realize a variety of motions of the legs 20R and 20L including walking of the robot 1.

Meanwhile, both the legs 20R and 20L are provided with multi-axis Force and Torque (F/T) sensors 24, respectively, between the foot 23 and the ankle joint mechanism 230. The multi-axis F/T sensor 24 measures three directional force components Fx, Fy and Fz transmitted from the foot 23 and three directional moment components Mx, My and Mz, thereby detecting landing of the foot 23 and load applied to the foot 23.

The head 40 may be installed with cameras 41 functioning as eyes of the robot 1 and micro-phones 42 functioning as ears of the robot 1.

The head 40 is connected to the body 10 via a neck joint mechanism 410. The neck joint mechanism 410 may include a yaw-directional rotating joint 411, a pitch-directional rotating joint 412 and a roll-directional rotating joint 413 and thus, may have a DOF of 3.

The respective rotating joints 411, 412 and 413 of the neck joint mechanism 410 are connected with motors (not shown) for use in rotation of the head 40. The control unit 12 controls the respective motors so as to drive the rotating joints 411, 412 and 413 by appropriate angles, to move the head 40 in a desired direction.

Each of the arms 30R and 30L includes an upper-arm link 31, a fore-arm link 32, and a hand 33. The upper-arm link 31 is connected to the body 10 via a shoulder joint assembly 310. The upper-arm link 31 and the fore-arm link 32 are connected to each other via an elbow joint mechanism 320, and the fore-arm link 32 and the hand 33 are connected to each other via a wrist joint mechanism 330.

The elbow joint mechanism 320 may include a pitch-directional rotating joint 321 and a yaw-directional rotating joint 322 and thus, may have a DOF of 2. The wrist joint mechanism 330 may include a pitch-directional rotating joint 331 and a roll-directional rotating joint 332 and thus, may have a DOF of 2.

Five fingers 33a are installed on the hand 33. A plurality of joints (not shown) that are driven by a motor may be installed in each finger 33a. The fingers 33a perform a variety of motions, for example, gripping an object or to pointing in a specific direction, in linkage with movement of the arm 30.

The shoulder joint assemblies 310R and 310L are mounted at opposite sides of the body 10, to connect both the arms 30R and 30L to the body 10. The two shoulder joint assemblies 310R and 310L have the same configuration and thus, only the right shoulder joint assembly 310R will be described hereinafter by way of an example.

Figure 3:
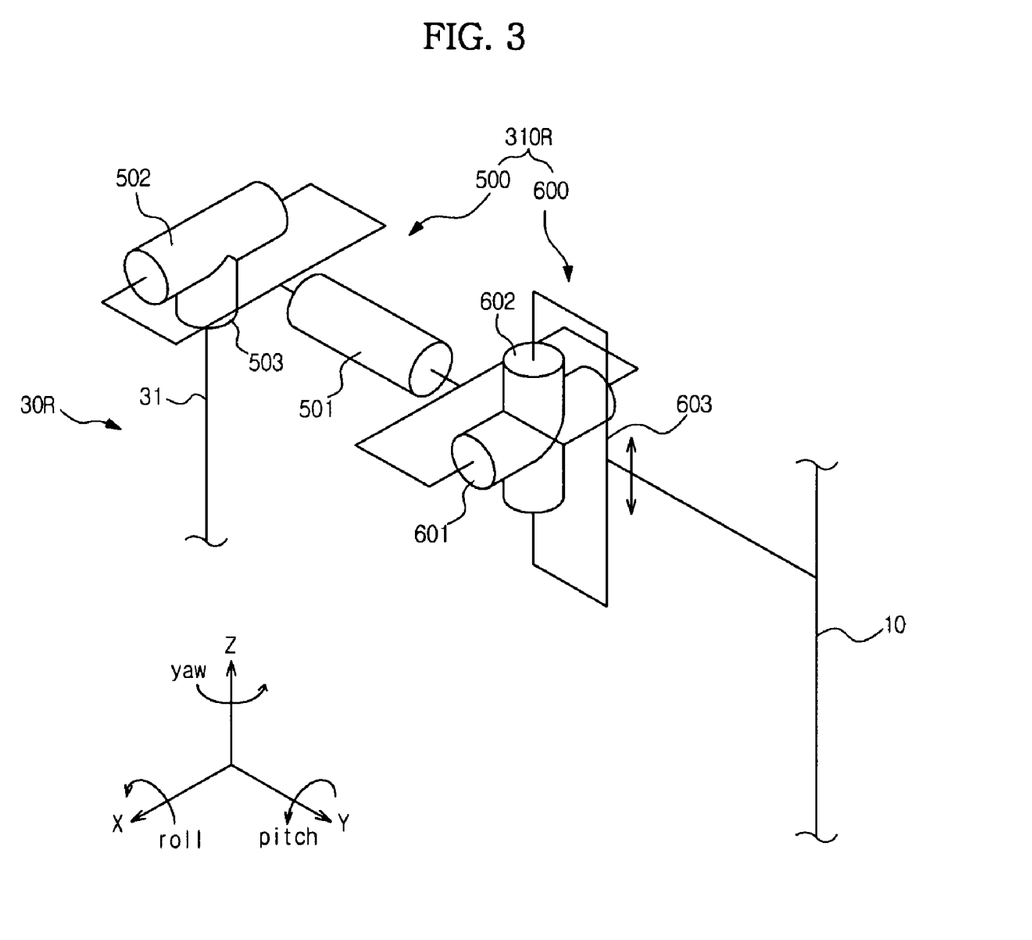
FIG. 3 is a partially enlarged view of FIG. 2.

FIG. 3 is a partially enlarged view of FIG. 2. As shown in FIG. 3, the shoulder joint assembly 310R includes a first shoulder joint device 500. The first shoulder joint device 500 is disposed between the body 10 of the robot 1 and the arm 30R and serves to move the arm 30R.

The first shoulder joint device 500 is mounted to the robot 1 such that it is entirely movable relative to the robot body 10. Here, the phrase "entirely movable relative to the robot body" means that all constituent components of the first shoulder joint device 500 may move together relative to the body 10, rather than only specific ones of the components used to move the arm 30R being movable relative to the body 10.

If the arm 30R can be moved by the first shoulder joint device 500 even after both the first shoulder joint device 500 and the arm 30R connected thereto are entirely moved, further various motions and gestures can be realized as compared to conventional robots having a shoulder joint fixed to a robot body. Moreover, the arm 30R can achieve a wide range of movement without moving the body 10.

To allow the first shoulder joint device 500 to entirely move relative to the body 10, a second shoulder joint device 600 may be installed between the first shoulder joint device 500 and the body 10, to move the first shoulder joint device 500.

The shoulder joint assembly 310R, including the first shoulder joint device 500 and the second shoulder joint device 600, may be configured to have a DOF of at least 4. For example, the first shoulder joint device 500 may have a DOF of 3 and the second shoulder joint device 600 may have a rotational DOF of at least 1 or a translational DOF of at least 1.

FIG. 3 illustrates an example wherein each of the first shoulder joint devices 500 and the second shoulder joint device 600 has a DOF of 3 and thus, the shoulder joint assembly 310R has a total DOF of 6. As shown in FIG. 3, the first shoulder joint device 500 may include a pitch-directional rotating joint 501, a roll-directional rotating joint 502, and a yaw-directional rotating joint 503 and thus, may have a rotational DOF of 3.

The respective rotating joints 501, 502 and 503 of the first shoulder joint device 500 are driven by individual motors (not shown). The control unit 12 appropriately controls the motors provided at the first shoulder joint device 500, to move the arm 30R to a desired position, or to realize a variety of motions and gestures using the arm 30R.

The second shoulder joint device 600 may be configured to have a rotational DOF of 2 and a translational DOF of 1. More specifically, the second shoulder joint device 600 includes a roll-directional rotating joint 601 and a yaw-directional second rotating joint 602, which serve to rotate the first shoulder joint device 500, and a translating joint 603 to translate the first shoulder joint device 500.

The first shoulder joint device 500 and the arm 30R can be entirely rotated in a roll direction via the first rotating joint 601. The first rotating joint 601, the first shoulder joint device 500 and the arm 30R can be entirely rotated in a yaw-direction via the second rotating joint 602. Also, the second rotating joint 602, the first rotating joint 601, the first shoulder joint device 500 and the arm 30R can be translated vertically via the translating joint 603.

Figure 4:
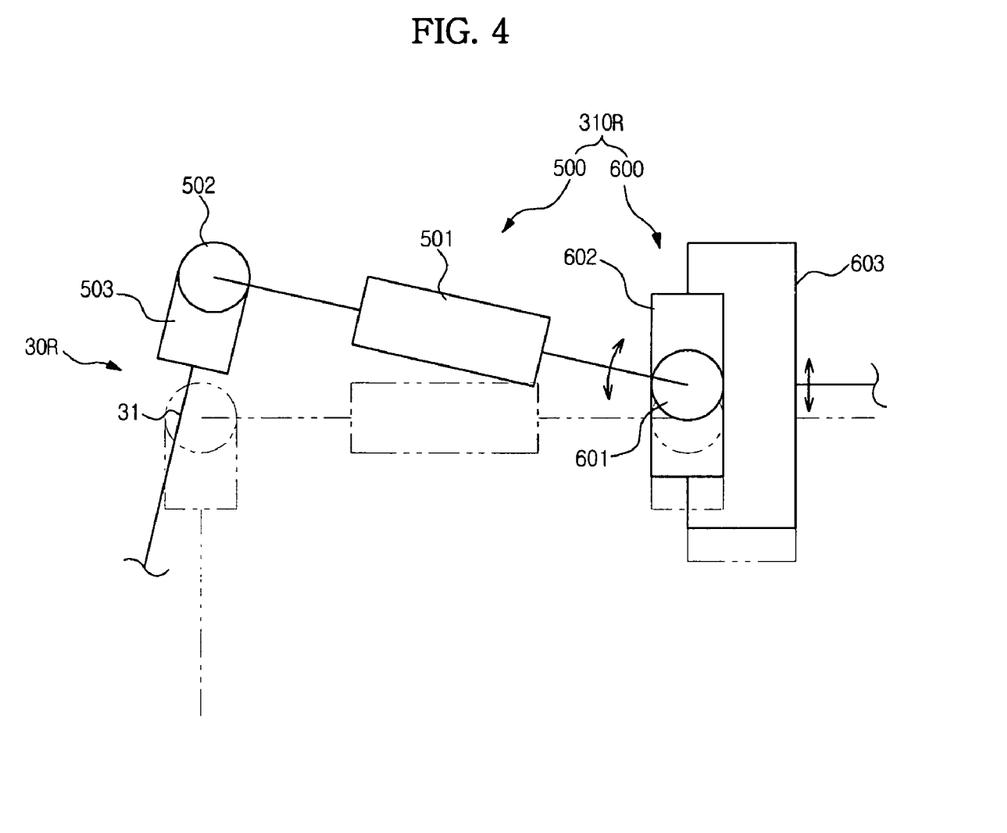
FIG. 4 is a view illustrating a motion example of the robot using a first rotating joint and a translating joint provided in a second shoulder joint device.
Figure 5:
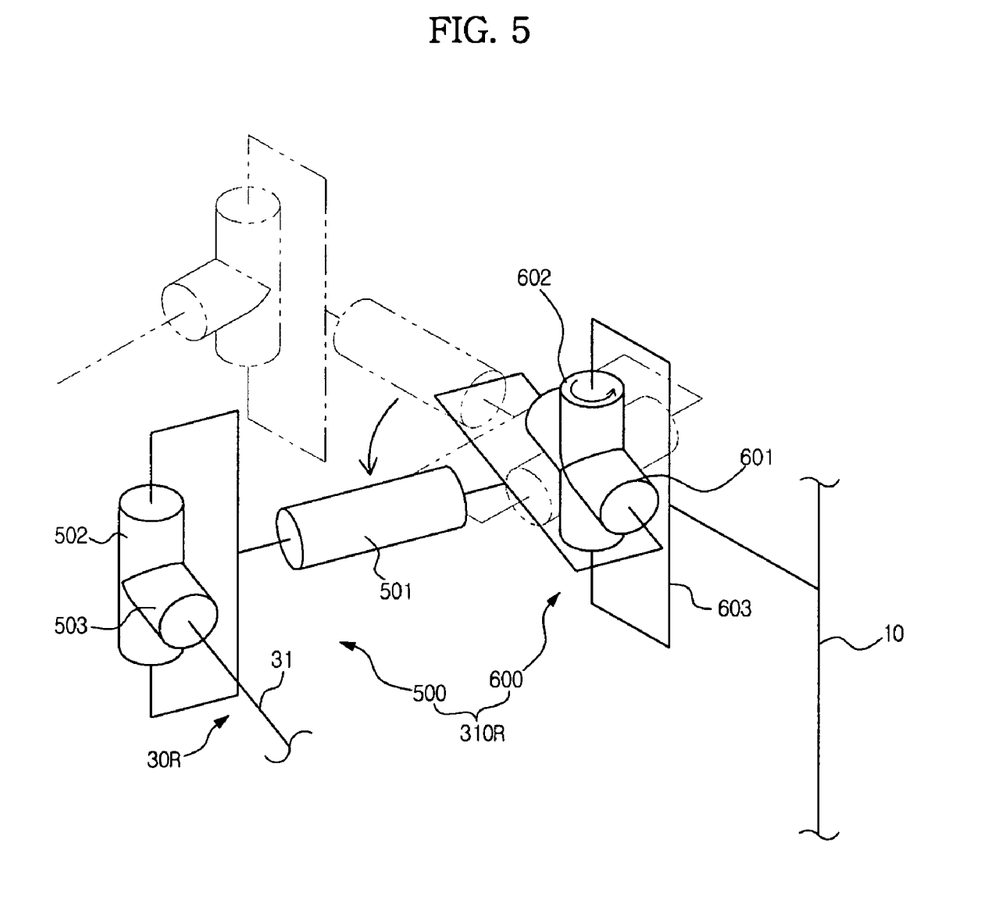
FIG. 5 is a view illustrating a motion example of the robot using a second rotating joint of the second shoulder joint device of an embodiment of the present invention.

FIG. 4 is a view illustrating a motion example of the robot using the first rotating joint and the translating joint of the second shoulder joint device, and FIG. 5 is a view illustrating a motion example of the robot using a second rotating joint of the second shoulder joint device.

As shown in FIG. 4, the robot 1 can perform a motion to rotate the first shoulder joint device 500 and the arm 30R upward by a predetermined angle via the first rotating joint 601 and then, to return them to original positions thereof. Simultaneously, the robot 1 can perform a motion to slightly move the entire first shoulder joint device 500 and the entire arm 30R upward via the translating joint 603, and then, to return these elements to original positions thereof. These motions of the robot 1 are very similar to a human shrug.

As another example, contrary to the illustration of FIG. 4, when the first shoulder joint device 500 and the arm 30R are rotated downward by a predetermined angle via the first rotating joint 601 and the first shoulder joint device 500 and the arm 30R are moved slightly downward via the translating joint 603, a gesture of drooping shoulders can be expressed.

In a further example as shown in FIG. 5, as the first shoulder joint device 500 and the arm 30R are rotated toward the body 10 via the second rotating joint 602, the upper arm of the robot 1 can be located in front of the body 10. With utilization of this motion, the robot 1 can imitate a motion of folding arms or an embrace.

It is understood that FIGS. 4 and 5 simply illustrate some examples of possible motions of the robot 1 in accordance with the embodiment of the present invention, and various human gestures, which could not be performed by conventional robots, can be realized by appropriately controlling movements of the second shoulder joint device 600 to allow the first shoulder joint device 500 to move relative to the body 10.

In addition, when the rotating joints of the first and second shoulder joint devices 500 and 600 are operated simultaneously, more rapidly moving the hand of the robot 1 to a desired position is possible. For example, when the second rotating joint 602 of the second shoulder joint device 600 and the roll-directional rotating joint 502 of the first shoulder joint device 500 are operated simultaneously, a distal end of the arm 30R, to which the hand of the robot 1 is mounted, can be rotated rapidly toward the body 10.

Figure 6:
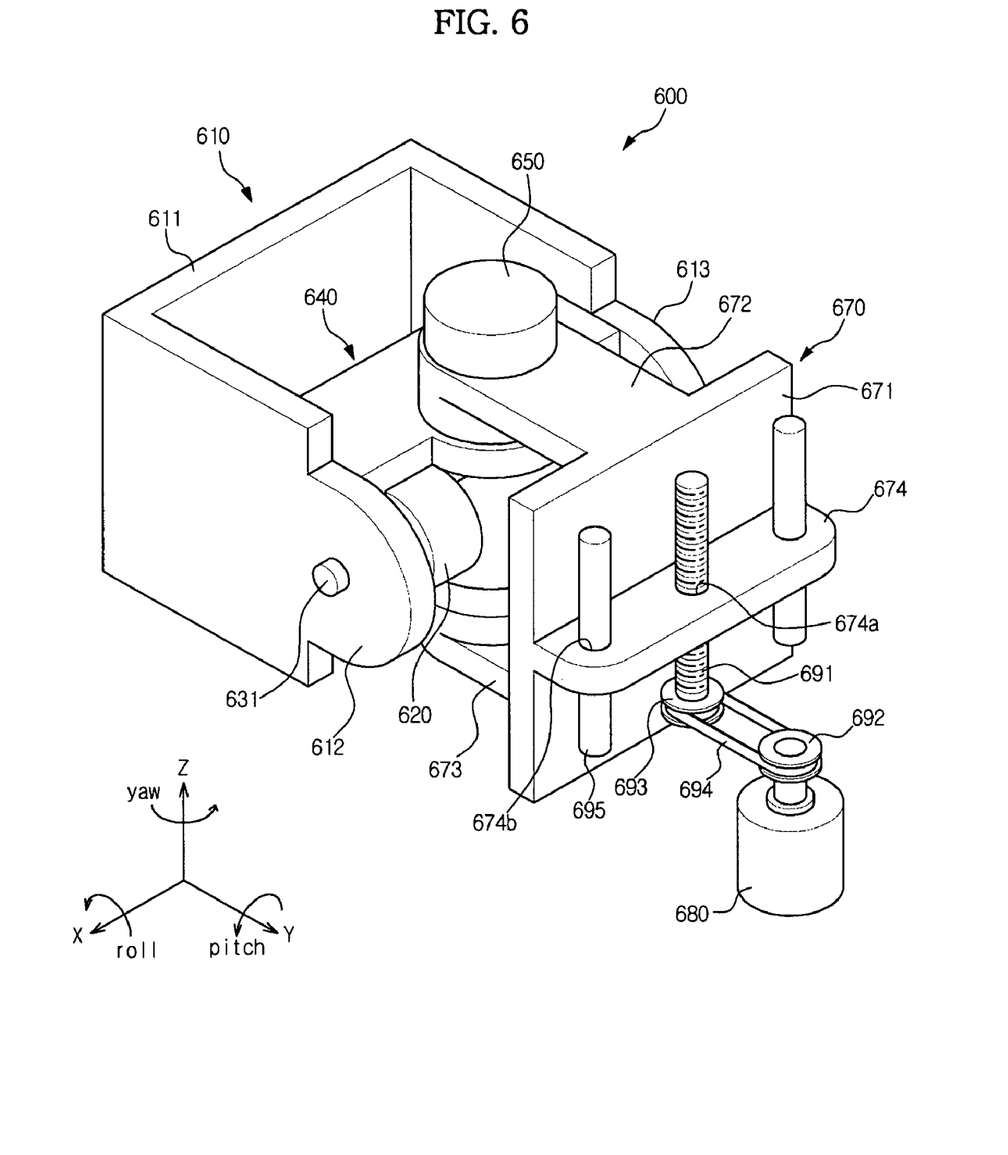
FIG. 6 is a perspective view illustrating a detailed embodiment of the second shoulder joint device in accordance with the embodiment of the present invention.
Figure 7:
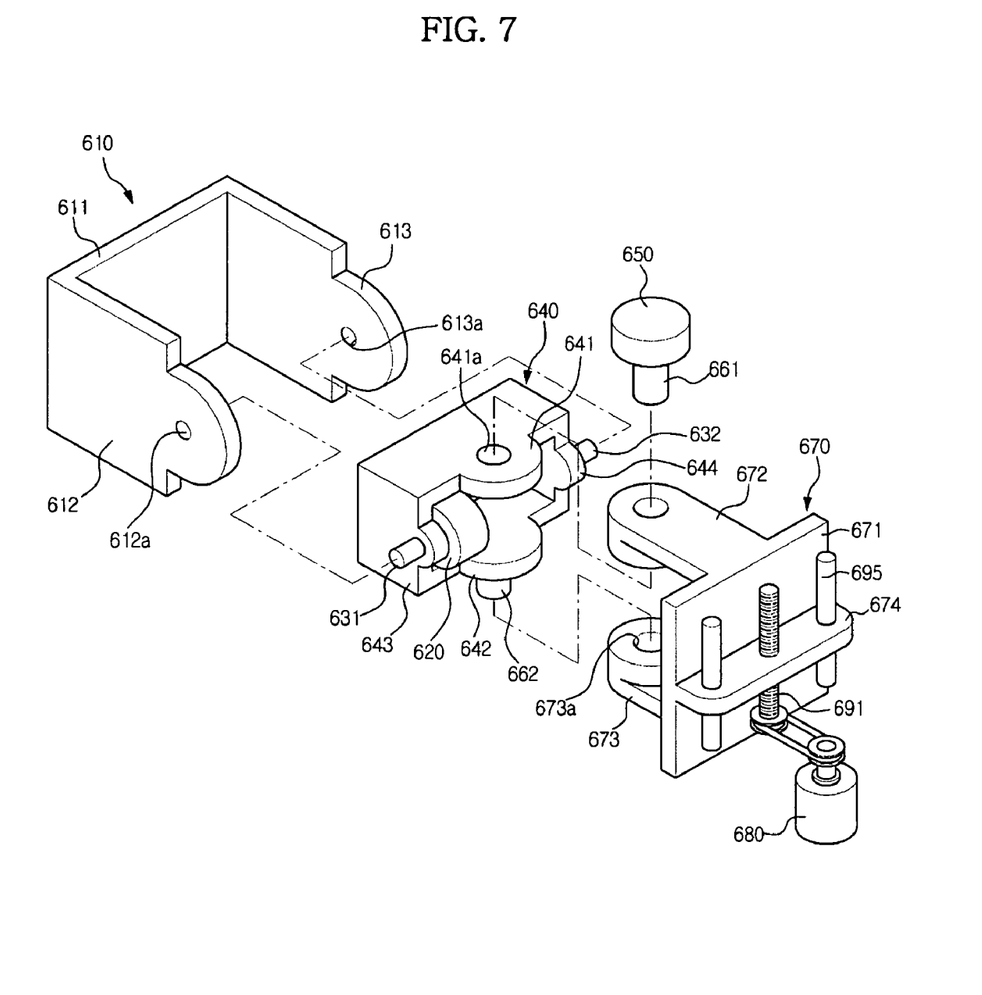
FIG. 7 is an exploded perspective of the second shoulder joint device of FIG. 6.

FIG. 6 is a perspective view illustrating a detailed embodiment of the second shoulder joint device in accordance with the embodiment of the present invention, and FIG. 7 is an exploded perspective of the second shoulder joint device of FIG. 6.

As shown in FIGS. 6 and 7, the second shoulder joint device 600 includes a first joint bracket 610 which is rotatable in a roll direction, a second joint bracket 640 which is rotatable in a yaw direction, and a third joint bracket 670 which is mounted to the body 10 of the robot 1 (See FIGS. 2 and 3) to translate vertically.

The first joint bracket 610 includes a supporting panel 611 opposite the first shoulder joint device 500 (See FIG. 3). The first shoulder joint device 500 is connected to the supporting panel 611. Accordingly, the first shoulder joint device 500 can move in linkage with the first joint bracket 610.

The first joint bracket 610 further includes a first hinge panel 612 and a second hinge panel 613 extending from front and rear sides of the supporting panel 611 toward the robot body 10. The first hinge panel 612 and the second hinge panel 613 are formed with shaft coupling holes 612a and 613a, respectively.

The second joint bracket 640 is disposed between the first hinge panel 612 and the second hinge panel 613 of the first joint bracket 610. The second joint bracket 640 includes a third hinge panel 641, a fourth hinge panel 642, a front panel 643 and a rear panel 644. The third hinge panel 641 is formed with a shaft coupling hole 641a.

The third hinge panel 641 and the fourth hinge panel 642 are arranged vertically in parallel. The front panel 643 and the rear panel 644 are arranged opposite the first hinge panel 612 and the second hinge panel 613 of the first joint bracket 610, respectively.

A first drive motor 620 to rotate the first joint bracket 610 is mounted to the second joint bracket 640. A first rotating shaft 631 to be operated by the first drive motor 620 is fitted into the shaft coupling hole 612a of the first hinge panel 612. The first rotating shaft 631 is penetrated through the front panel 643 of the second joint bracket 640 to thereby be fixed to the first hinge panel 612. Accordingly, as the first rotating shaft 631 rotates, the first joint bracket 610 can be rotated in a roll direction.

A second rotating shaft 632, which is arranged coaxially with the first rotating shaft 631, is fitted into the shaft coupling hole 613a of the second hinge panel 613. The second rotating shaft 632 is penetrated through the rear panel 644 of the second joint bracket 640 and serves to rotate the first joint bracket 610 relative to the second joint bracket 640.

The third joint bracket 670 includes a supporting panel 671 which is coupled to the body 10 of the robot 1 in a vertically movable manner, and upper and lower panels 672 and 673 arranged in parallel at upper and lower sides of the supporting panel 671. The upper panel 672 is disposed above the third hinge panel 641 of the second joint bracket 640, and the lower panel 673 is disposed below the fourth hinge panel 642.

A second drive motor 650 to rotate the second joint bracket 640 is mounted on the upper panel 672. A third rotating shaft 661 to be operated by the second drive motor 650 is fitted into the shaft coupling hole 641a of the third hinge panel 641. The third rotating shaft 661 is penetrated through the upper panel 672 of the third joint bracket 670 to thereby be fixed to the third hinge panel 641. Accordingly, as the third rotating shaft 661 rotates, the second joint bracket 640 can be rotated in a yaw direction and simultaneously, the first joint bracket 610, connected to the second joint bracket 640 via the first and second rotating shafts 631 and 632, can be rotated in a yaw direction.

Meanwhile, the fourth hinge panel 642 of the second joint bracket 640 is provided with a fourth rotating shaft 662 that is coaxial with the third rotating shaft 661. The fourth rotating shaft 662 is rotatably fitted into a shaft coupling hole 673a formed at the lower panel 673 of the third joint bracket 670.

The third joint bracket 670 is operated vertically by a third drive motor 680. If the third joint bracket 670 is operated by the third drive motor 680, the second joint bracket 640 connected to the third joint bracket 670 and the first joint bracket 610 connected to the second joint bracket 640 can be translated vertically.

The third joint bracket 670 further includes a coupling panel 674 extending from the supporting panel 671 toward the body 10 of the robot 1. The coupling panel 674 is provided with a nut 674a, into which a drive screw 691 installed at the body 10 of the robot 1 is fastened.

The third drive motor 680 is mounted to the body 10 of the robot 1, and transmits power to the drive screw 691 via pulleys 692 and 693 and a belt 694.

Meanwhile, the body 10 of the robot 1 is provided with guide shafts 695. The guide shafts 695 are inserted into guide holes 674b formed at the coupling panel 674, to guide movements of the third joint bracket 670.

Although FIGS. 6 and 7 illustrate an example of operating the third joint bracket 670 using a screw-nut mechanism, other various drive mechanisms can be utilized so long as they can translate the third joint bracket 670. For example, rack gears or linear motors can be used to translate the third joint bracket 670.

As apparent from the above description, in a humanoid robot in accordance with the present invention, a shoulder joint device, used to move a robot arm, is configured to entirely move relative to a robot body, enabling implementation of various motions and humanoid gestures, which conventional humanoid robots are incapable of, wherein a shoulder joint is fixed to a robot body.

Further, according to the embodiment of the present invention, a wide range of movement of a robot arm can be accomplished without moving the robot body. In addition, when the robot arm is moved by appropriately combining movements of rotating joints of a shoulder joint assembly, a more rapid movement of a distal end of the robot arm is possible.

Although an embodiment has been shown and described, it would be appreciated by those skilled in the art that changes may be made in this embodiment without departing from the principles and spirit of the invention, the scope of which is defined in the claims and their equivalents.

What is claimed is:

1. A humanoid robot comprising:
   a body;
   an arm;
   a first shoulder joint device and a second shoulder joint device disposed between the body and the arm, to move the arm;
   an elbow joint mechanism; and
   a wrist joint mechanism,
   wherein the arm is entirely movable relative to the body by the first and second shoulder joint devices,
   the second shoulder joint device is disposed between the body and the first shoulder joint device, to move the first shoulder joint device, and
   the second shoulder joint device has a Degree Of Freedom (DOF) of 3.

2. The robot according to claim 1, wherein the first shoulder joint device has a Degree Of Freedom (DOF) of 3.

3. The robot according to claim 1, wherein the second shoulder joint device has a rotational DOF of at least 1.

4. The robot according to claim 1, wherein the second shoulder joint device has a translational DOF of at least 1.

5. The robot according to claim 1, wherein the second shoulder joint device has a rotational DOF of 2 and a translational DOF of 1.

6. The robot according to claim 1, wherein the second shoulder joint device includes a roll-directional rotating joint.

7. The robot according to claim 1, wherein the second shoulder joint device includes a yaw-directional rotating joint.

8. The robot according to claim 1, wherein the second shoulder joint device is installed to the body in a vertically movable manner.

9. The robot according to claim 1, wherein all of the elements of the first shoulder joint device are movable relative to the body.

10. The robot according to claim 1, wherein the first shoulder joint device comprises a plurality of rotating joints to rotate respectively about roll, pitch and yaw axes.

11. A humanoid robot comprising:
    an arm;
    a body;
    a first shoulder joint device connected to the arm;
    a second shoulder joint device connected to the first shoulder joint device and the body, and including a translating joint to translate the first shoulder joint device;
    an elbow joint mechanism; and
    a wrist joint mechanism,
    wherein the second shoulder joint device has a Degree Of Freedom (DOF) of 3.

12. The robot according to claim 11, wherein the translating joint moves the first shoulder joint device vertically.

13. The robot according to claim 11, wherein the second shoulder joint device further includes at least one rotating joint.

14. The robot according to claim 13, wherein the second shoulder joint device includes a first rotating joint to rotate the first shoulder joint device in a roll direction.

15. The robot according to claim 14, wherein the second shoulder joint device includes a second rotating joint to rotate the first shoulder joint device and the first rotating joint in a yaw direction.

16. The robot according to claim 15, wherein the translating joint translates the first rotating joint and the second rotating joint.

17. A shoulder joint assembly of a humanoid robot having a DOF of 6, comprising:
  a first shoulder joint device connected to an arm of the humanoid robot and having a rotational DOF of 3; and
  a second shoulder joint device connected to a body of the humanoid robot and used to move the first shoulder joint device,
  wherein the second shoulder joint device has a Degree Of Freedom (DOF) of 3.

18. The assembly according to claim 17, wherein the second shoulder joint device is movable vertically relative to the body.

19. The assembly according to claim 17, wherein the second shoulder joint device has a rotational DOF of 2 and a translational DOF of 1.

20. The assembly according to claim 17, wherein the second shoulder joint device includes a roll-directional first rotating joint and a yaw-directional second rotating joint.

21. A shoulder joint assembly of a humanoid robot including an arm and a body, the shoulder joint assembly comprising:
  a first shoulder joint device connected to the arm;
  a second shoulder joint device connected to the body and the first shoulder joint device;
  an elbow joint mechanism; and
  a wrist joint mechanism,
  wherein the second shoulder joint device includes a first rotating joint and a second rotating joint to rotate the first shoulder joint device in a roll direction and a yaw direction, respectively, and a translating joint to translate the first shoulder joint device.

* * * * *